Oct. 15, 1968 W. KLENK ET AL 3,406,263

TELEPHONE CRADLE SWITCH ARRANGEMENTS

Filed March 19, 1965

United States Patent Office 3,406,263
Patented Oct. 15, 1968

3,406,263

TELEPHONE CRADLE SWITCH ARRANGEMENTS

Wilfried Klenk, Berlin, and Horst Ringhandt, Berlin-Lichterfelde, Germany, assignors to International Standard Electric Corporation, New York, N.Y., a corporation of Delaware Filed Mar. 19, 1965, Ser. No. 441,182
Claims priority, application Germany, Apr. 1, 1964, St 21,911
2 Claims. (Cl. 179—100)

The invention relates to telephone cradle switch arrangements, and in particular to arrangements including push button keys which can be released by the cradle switch via a mechanical connection and also can be locked, if so required.

An essential component of secretarial telephone systems is a push button panel, consisting of individual keys or push buttons, any may use luminous buttons or several push button key strips. These push buttons and push button strips are, in known telephone systems, interconnected by rods consisting of slides or traps in order to obtain interaction therebetween. The cradle switch is mechanically connected to also restore actuated push buttons when the handset is replaced into the cradle and to block the actuation of push buttons while the cradle switch is depressed.

There are, on the other hand, handsfree telephone sets known which are equipped with a microphone, an amplifier, and a loudspeaker, enabling a telephone call without lifting the handset.

The object of the present invention is to provide new and unique telephone cradle switch arrangements.

A more specific object is to provide a cradle switch-over device enabling the use of a handsfree speaking facility with telephone sets equipped with push buttons that can be released or locked via a mechanical connection between the push buttons and the cradle switch having a coupling controlled by a corresponding push button through which the mechanical connection can be interrupted. By means of a "call-completed key" the push button for the handsfree speaking facility can be released and the mechanical connection restored. By simple separation of the mechanical connection between push button strip and cradle switch, the keys or push buttons can be operated as if the handset has been lifted. When the handsfree speaking push button has been actuated, a trunk line can be seized for example, by pressing a suitable push button or the call can be forwarded to another sub-set. A contact spring set on the handsfree speaking push button takes over the function of the cradle switch contact spring set. Pressing of said push button mechanically and electrically replaces the lifting of the handset.

The above mentioned and other features of this invention and the manner of obtaining them will become more apparent, and the invention itself will be best understood by reference to the following description of an embodiment of the invention taken in conjunction with the accompanying drawings, in which.

Figure 1:
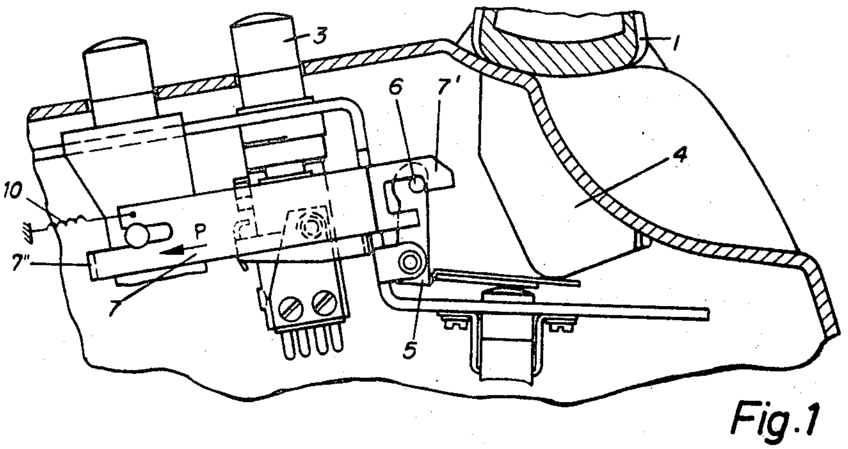
FIG. 1 shows a cross sectional view illustrating the handset and the push buttons in non-operative position.

The handset 1 actuates a cradle switch 5 through two switch strips 4. The cradle shows a lever, at the top end of which a follower pin 6 is riveted. A slide 7 provides mechanical connection of the key panel with the cradle switch. The slide 7 bears on one end a claw-like stud 7' which engages the follower pin 6. The other end 7'' of said slide is constructed so that pressed buttons of the key panel can be released by swivelling a trap or moving of a slide (not shown on the drawing). A spring 10, schematically shown, influences the slide 7 in the direction of the arrow P.

On a push button 3, the handsfree speaking push button, a control lever 8 is pivoted. A knob 9 of said push button serves to actuate an associated contact spring set and moreover, operates the control lever 8, via a stud 9'.

Figure 2:
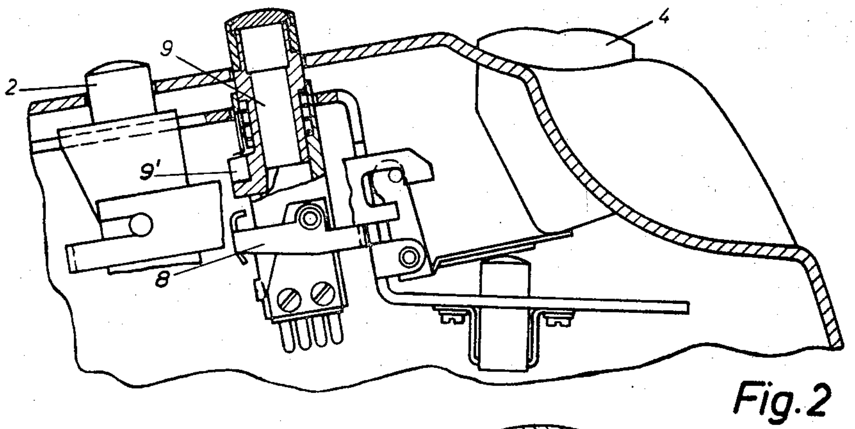
FIG. 2 shows a cross sectional view illustrating the cradle switch and one push button, for example, for a trunk line, in actuated condition.

When the handsfree speaking push button 3 is not pressed, as best shown in FIGS. 1, 2, the motion of the cradle strips 4 is transmitted, via the cradle 5 and the follower pin 6 onto the slide 7 releasing the pressed push buttons 2 when removing the handset or locking the push buttons when restoring the handset.

Figure 3:
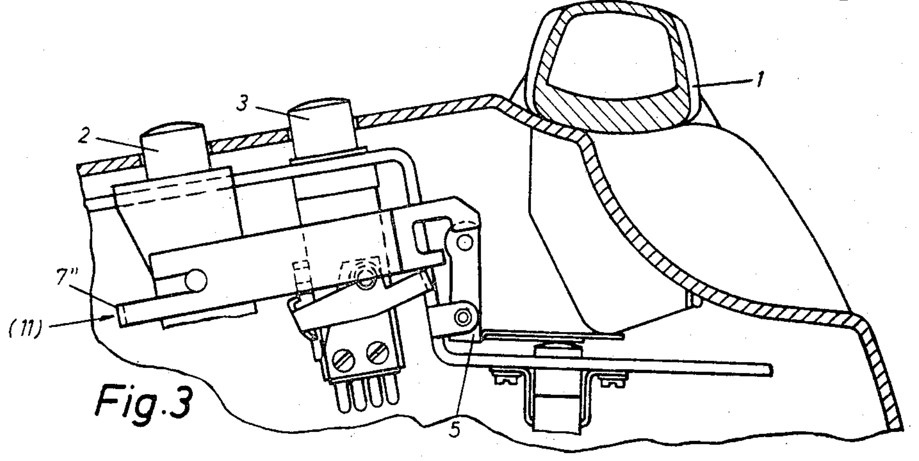
FIG. 3 shows a cross sectional view illustrating the handset in non-operative position and the trunk line button and the free hand speaking push button in actuated position.

When, as best shown in FIG. 3, the handsfree speaking push button 3 is pressed, the slide 7 is lifted by the control lever 8 and the follower pin 6 is thereby disengaged. The spring force P moves the slide 7 towards the left to the same extent as if the handset would be removed. The push buttons 2 are thereby unlocked.

When the handsfree speaking push button 3 is pressed, lifting and restoring of the handset, when changing between handsfree speaking and a call through the handset, does not cause the release of the push buttons. When the call conducted handsfree is completed all pressed push buttons including the handsfree speaking push button 3 are released by pressing a separate push button 11 at the end of a call. The mechanical connection between the cradle switch and push button panel is thereby restored so that the telephone set is ready for another call either using the handset or the handsfree speaking facility.

While the principles of the invention have been described above in connection with specific apparatus and applications, it is to be understood that this description is made only by way of example and not as a limitation on the scope of the invention.

We claim:

1. A cradle switch device for telephone sets having hands free facilities, said telephone sets equipped with first push buttons which can be released or locked through a mechanical connection with the said cradle switch, said mechanical connection including a coupling, a corresponding push button for controlling the coupling, means responsive to the operation of said corresponding push button for actuating said coupling to interrupt said mechanical connection, a call-completed push button, and means responsive to the actuation of said call completed push button for releasing the corresponding push button and restoring the mechanical connection.

2. A device according to claim 1, in which the mechanical connection includes a slide and a lever on the cradle switch, a follower pin on said lever, said slide having a claw-shaped stud on one end normally engaging said follower pin, control lever means for lifting said slide, and means actuated by the corresponding push button for disengaging the follower pin thereby decoupling said mechanical connection and releasing said first push buttons.

No references cited.

KATHLEEN H. CLAFFY, *Primary Examiner.*

A. H. GESS, *Assistant Examiner.*